No. 773,685. Patented November 1, 1904.

UNITED STATES PATENT OFFICE.

ELMER A. SPERRY, OF CLEVELAND, OHIO.

STORAGE-BATTERY ELECTRODE AND PROCESS OF MAKING SAME.

SPECIFICATION forming part of Letters Patent No. 773,685, dated November 1, 1904.

Application filed January 28, 1904. Serial No. 191,053. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Storage-Battery Electrodes and Processes of Producing Them, of which the following is a specification.

This invention relates to the production of electrodes of the class in which a grid or support carries an active material initially consisting of an oxid or oxids of lead. The purpose is to produce a highly-porous active material, preferably consisting of nearly equal parts of litharge and minium, and to provide the body or bodies of porous active material carried by the grid or support with relatively large feeder-pores for the electrolyte.

In carrying out the invention a carbonate of lead is first chemically precipitated from a solution of a lead salt. The precipitated lead compound may be the normal carbonate $PbCO_3$ or any of the basic carbonates, but is preferably the basic carbonate known as "white lead," of the formula $2PbCO_3, Pb(OH)_2$. The carbonate may be precipitated from an aqueous solution of any soluble lead salt, such as the acetate or nitrate. According to the preferred mode of operation, white lead is electrolytically produced by passing an electric current from a lead anode through an aqueous solution of sodium acetate and continuously injecting carbon dioxid into the solution.

The pure precipitated lead carbonate, which exists in a state of extremely fine subdivision, is roasted to expel the carbon dioxide and produce a highly-porous oxid or oxids of lead. The roasting is preferably carried to such a point as to produce a porous mixture containing ten parts of litharge and twelve parts of minium. The porous oxid or oxids may be directly applied to a grid or support. It is preferred, however, to add to the active material a salt or other body which can be readily dissolved out by placing the electrode in water, also a salt capable of partially combining with and hardening lead oxids. Ammonium sulfate is the salt which is preferably employed, from five to ten per cent. being mixed with the active material. The mixture is then applied to the grid or support, being pasted or press-welded in place, and the electrode is placed in water, whereby the greater and uncombined portion of the ammonium sulfate is dissolved out, leaving relatively large feeder-pores for the electrolyte extending throughout the active material. The electrode is then formed by any usual process.

I claim—

1. The process of producing storage-battery electrodes, which consists in precipitating a carbonate of lead from a solution of a lead salt, roasting said carbonate to expel the carbon dioxid and produce a highly-porous oxid or oxids of lead, and applying said oxid or oxids to a grid or support, as set forth.

2. The process of producing storage-battery electrodes, which consists in precipitating a carbonate of lead from a solution of a lead salt, roasting said carbonate to expel the carbon dioxid and produce a highly-porous mixture of litharge and minium, and applying said mixture to a grid or support, as set forth.

3. The process of producing storage-battery electrodes, which consists in precipitating a carbonate of lead from a solution of a lead salt, roasting said carbonate to expel the carbon dioxid and produce a highly-porous mixture containing substantially equal parts of litharge and minium, and applying said mixture to a grid or support, as set forth.

4. The process of producing storage-battery electrodes, which consists in electrolytically producing a carbonate of lead, roasting said carbonate to expel the carbon dioxid and produce a highly-porous oxid or oxids of lead, and applying said oxid or oxids to a grid or support, as set forth.

5. The process of producing storage-battery electrodes, which consists in precipitating a carbonate of lead from a solution of a lead salt, roasting said carbonate to expel the carbon dioxid and produce a highly-porous oxid or oxids of lead, mixing with said oxid or oxids a soluble substance, applying said mixture to a grid or support, and dissolving out the soluble substance thereby leaving feeder-pores for the porous active material, as set forth.

6. The process of producing storage-battery electrodes, which consists in precipitating a carbonate of lead from a solution of a lead salt, roasting said carbonate to expel the carbon dioxid and produce a highly-porous oxid or oxids of lead, mixing with said oxid or oxids a soluble substance capable of partially combining with and hardening lead oxids, applying the mixture to a grid or support, and dissolving out the soluble substance thereby leaving feeder-pores for the porous active material, as set forth.

7. A storage-battery electrode having active material consisting of a highly-porous oxid or oxids of lead, produced by roasting a chemically-precipitated carbonate of lead, as set forth.

8. A storage-battery electrode having active material consisting of a highly-porous oxid or oxids of lead, produced by roasting an electrolytic carbonate of lead, as set forth.

9. A storage-battery electrode having active material consisting of a highly-porous mixture of litharge and minium, produced by roasting a chemically-precipitated carbonate of lead, as set forth.

10. A storage-battery electrode having active material consisting of a highly-porous mixture of substantially equal parts of litharge and minium, produced by roasting a chemically-precipitated carbonate of lead, as set forth.

11. A storage-battery electrode having active material consisting of a highly-porous oxid or oxids of lead, produced by roasting a chemically-precipitated carbonate of lead, said porous active material having relatively large feeder-pores extending through it, as set forth.

12. A storage-battery electrode having active material consisting of a highly-porous, hardened mixture of litharge and minium, produced by roasting a chemically-precipitated carbonate of lead, said porous active material having relatively large feeder-pores extending through it, as set forth.

In testimony whereof I affix my signature in presence of two witnesses.

ELMER A. SPERRY.

Witnesses:
   JOHN H. SIGGERS,
   EUGENE A. BYRNES.